Figure 1:
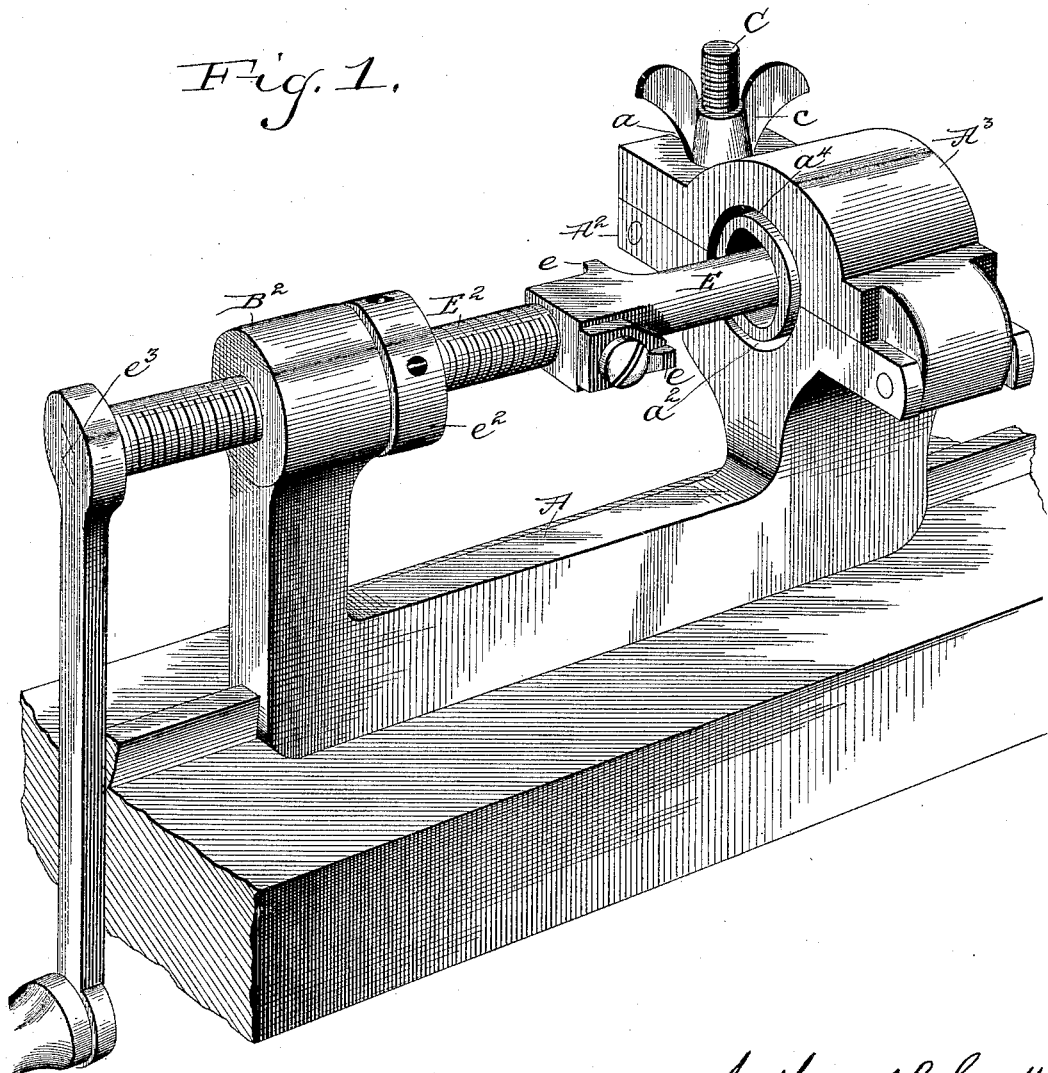

(No Model.) 2 Sheets—Sheet 1.

N. E. SMITH.
REAMER.

No. 466,728. Patented Jan. 5, 1892.

WITNESSES:
N. H. Pumphrey
F. B. Keefer

Nathaniel E. Smith
INVENTOR,
BY
R. G. Dyrenforth,
ATTORNEY.

(No Model.) 2 Sheets—Sheet 2.

N. E. SMITH.
REAMER.

No. 466,728. Patented Jan. 5, 1892.

WITNESSES:
W. W. Pumphrey
J. B. Keefer

Nathaniel E. Smith
INVENTOR,
BY
R. S. D. Wrenforth,
ATTORNEY.

UNITED STATES PATENT OFFICE.

NATHANIEL E. SMITH, OF JERSEY CITY, NEW JERSEY, ASSIGNOR OF ONE-HALF TO PHILLIP E. MARTIN, OF SAME PLACE.

REAMER.

SPECIFICATION forming part of Letters Patent No. 466,728, dated January 5, 1892.

Application filed September 1, 1891. Serial No. 404,449. (No model.)

*To all whom it may concern:*

Be it known that I, NATHANIEL E. SMITH, a citizen of the United States, residing at Jersey City, in the county of Hudson and State of New Jersey, have invented certain new and useful Improvements in Reamers; and I do hereby declare the following to be a full, clear, and exact description of the invention, such as will enable others skilled in the art to which it appertains to make and use the same.

This invention relates to reamers.

The object of the invention is to produce a simple, cheap, light, and easily-manipulated device capable of ready attachment and detachment, whereby the ends of pipes, particularly those of lead pipes, may be given a flaring and enlarged form, adapting them for use in connection with couplings of the kind described and shown in an application for Letters Patent filed by me in the United States Patent Office on August 13, 1889, Serial No. 320,580, (patented July 28, 1891, No. 456,781.)

With these objects in view the invention consists, essentially, in a clamp or holder provided with a movable portion facilitating speedy opening and closing of the same for retaining the pipe ends, a reaming-tool mounted in a frame to which the clamp or holder is attached, the reamer being placed in a line with the clamp or holder which is to receive the pipe to be worked upon, the remaining tool being also mounted in a slide and provided with a screw-threaded nut arranged upon the shank of the tool and designed to bear against an abutment, whereby the proper manipulation of the tool during work is facilitated.

Furthermore, the invention resides in a reamer consisting of a clamp or holder, composed of two hinged portions provided with a central opening for the reception of the pipe, a locking device whereby the parts of the clamp or holder may be speedily joined together or released from each other, a reaming-tool arranged in line with the opening in the pipe, the shank of the reaming-tool being screw-threaded and provided with a nut, and an abutment against which the nut bears in the operation of the tool.

Furthermore, the invention resides in a reamer consisting in a clamp or holder composed of two hinged parts provided with a locking device and with a central opening for the reception of the pipe, removable sections provided with projections designed to be placed in the opening in the clamp or holder to regulate the size of the opening for the reception of the pipe, and a reaming-tool arranged in line with the opening in the tool, provided with a screw-threaded shank, and passing through a nut, whereby by turning the tool it will be advanced.

I have illustrated the invention in the accompanying drawings, in which—

Figure 2:
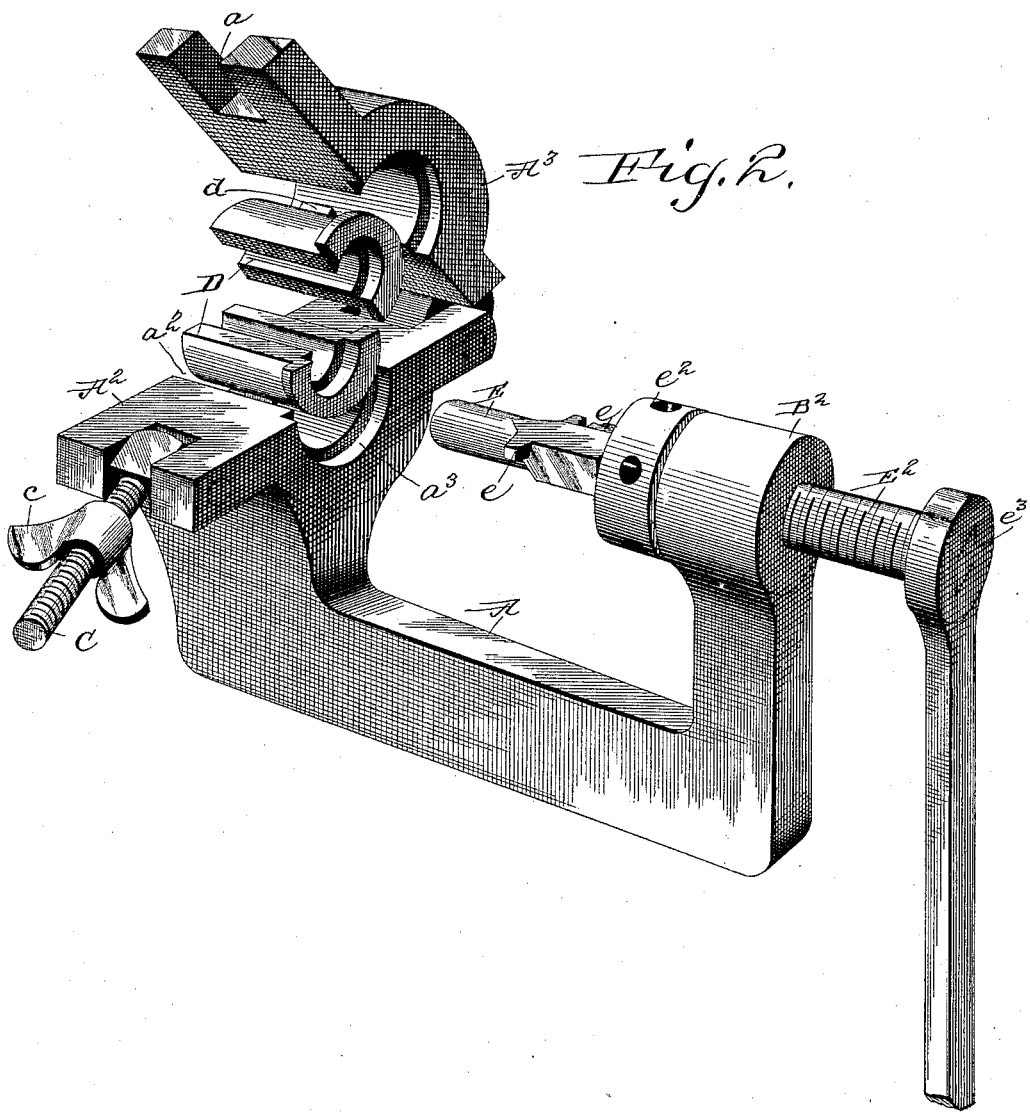

Figure 1 is a perspective view of a reamer constructed in accordance with my invention, the same being shown in an operative position; and Fig. 2 is a corresponding view, the holder or clamp being shown open, and the removable sections, whereby the size of the opening in the clamp or holder is regulated, being shown removable.

In the drawings, A represents the frame of the device, which has formed with or attached to one end the lower jaw $A^2$ of the holder or clamp, and is provided at the other end with a socket B, in which the tool is held and is free to slide. Hinged to the lower jaw $A^2$ of the holder or clamp is the upper jaw $A^3$, this jaw $A^3$ being provided at the end opposite to that at which it is hinged with an indentation $a$, designed to receive the screw-rod C, hinged at its lower end to the jaw $A^2$ and provided with a nut $c$, which, when the screw C occupies the opening $a$ in the upper jaw, is turned upon the upper surface of the jaw $A^3$ and serves to retain the pipe, which is held in the opening $a^2$, formed by indentations in the meeting faces of the jaws, firmly in position to be operated upon. The indentations in the jaws are of a size to receive the largest pipe commonly operated upon, and to allow the use of the device on smaller pipes I provide the sections D of different thicknesses. These are to be applied in the indentations to render the opening smaller, and for this purpose are provided with projecting pins $d$, entering holes $a^3$ in the indentations of the jaws.

E represents the reaming-tool, which is provided with cutting-edges $e$, of such form as to ream out and enlarge the ends of the pipe worked upon, the inner edges of the jaws $A^2$ and $A^3$ being provided with indentations $a^4$, permitting such enlargement of the pipe while held by the clamp.

The shank $E^2$ of the reaming-tool is threaded for nearly its entire length, and is provided with a square end $e^3$ for the reception of a handle whereby the tool is turned.

Between the portion B of the frame and the reaming-tool is placed the nut $e^2$, screw-threaded on its interior and engaging the screw-thread of the shank of the tool.

In the use of the tool the pipe to be worked upon is placed between the clamping-edges, and the same are then firmly locked together. When this is done, the tool is slid from its socket until the cutting-faces rest upon the end of the pipe, and then the nut $e^2$ is turned until it bears against the inner face of the socket. When the parts are in this position, turning of the shank of the tool to the right will result in cutting the end of the pipe and giving the desired form thereto, and will also result in the automatic forward feeding of the tool as the cutting-edges enter the pipe. Should it advance too rapidly, it is only necessary to turn the nut forward to a position away from the socket, when pressure which the tool exerts against the end of the pipe may be regulated by hand.

The tool may ordinarily be held in the hand or in a vise; but, if necessary, it may be provided on its lower face with a dovetailed groove designed to receive a dovetail $a^2$, attached to a board or plate, whereby it will be held firmly in a position for use.

Having thus fully described my invention, what I claim as new, and desire to secure by Letters Patent, is—

1. A reamer consisting, essentially, of a clamp or holder for retaining the pipe ends, a reaming-tool mounted and free to slide in a frame to which the clamp or holder is attached, the reamer being placed in line with the clamp or holder, and a nut placed upon the shank of the tool and bearing against the portion in which the tool slides, substantially as described.

2. A reamer consisting of a clamp or holder composed of two hinged portions provided with a central opening for the reception of the pipe, a locking device whereby the parts of the clamp or holder may be speedily joined together or released from each other, a reaming-tool having a screw-threaded shank arranged in line with the pipe to be worked upon, and a nut placed on the shank of the tool and bearing against an abutment, substantially as described.

3. A reamer consisting of a clamp or holder composed of hinged parts provided with a locking device and with a central opening for the reception of the pipe, removable sections provided with projections designed to be placed in the opening in the clamp or holder and to regulate the size of the opening for the reception of the pipe, and a reaming-tool arranged in line with the opening in the clamp or holder and provided with a screw-threaded shank passing through a nut, whereby by turning the tool the same will be advanced, substantially as described.

In testimony whereof I affix my signature in presence of two witnesses.

NATHANIEL E. SMITH.

Witnesses:
HARRY W. LANGE,
JNO. A. LANDREGAN.